United States Patent
Ito et al.

(10) Patent No.: US 7,718,920 B2
(45) Date of Patent: May 18, 2010

(54) METHOD AND DEVICE FOR HOLDING SHEET-LIKE WORKPIECE

(75) Inventors: Yasushi Ito, Ebina (JP); Fumiaki Kimura, Ebina (JP)

(73) Assignee: Hitachi Via Mechanics, Ltd., Kanagawa (JP)

( * ) Notice: Subject to any disclaimer, the term of this patent is extended or adjusted under 35 U.S.C. 154(b) by 0 days.

(21) Appl. No.: 11/265,162

(22) Filed: Nov. 3, 2005

(65) Prior Publication Data

US 2006/0096963 A1    May 11, 2006

(30) Foreign Application Priority Data

Nov. 10, 2004    (JP) .............................. 2004-326423

(51) Int. Cl.
*B23K 26/00*    (2006.01)

(52) U.S. Cl. .............................. 219/121.7; 219/121.71; 219/121.82

(58) Field of Classification Search .............. 219/121.7, 219/121.71, 121.82, 121.85, 121.6
See application file for complete search history.

(56) References Cited

U.S. PATENT DOCUMENTS

| | | | | |
|---|---|---|---|---|
| 2,332,590 A | * | 10/1943 | Mursch | 72/473 |
| 2,854,940 A | * | 10/1958 | Bate | 72/63 |
| 4,639,572 A | * | 1/1987 | Gruzman et al. | 219/121.67 |
| 6,147,319 A | * | 11/2000 | Imai et al. | 219/121.62 |
| 2004/0040148 A1 | * | 3/2004 | DeMaso et al. | 29/852 |

FOREIGN PATENT DOCUMENTS

JP    2001-105170    4/2001

\* cited by examiner

*Primary Examiner*—M. Alexandra Elve
(74) *Attorney, Agent, or Firm*—Wenderoth, Lind & Ponack, L.L.P.

(57) ABSTRACT

There is provided a method and a device capable of holding a sheet-like workpiece without wrinkles. The sheet-like workpiece holding method includes mounting the sheet-like workpiece such that almost no tensile force is applied thereon on a machining table, and pressing out wrinkles of the sheet-like workpiece by lowering a pressing member whose surface facing to the workpiece protrudes in the shape of a convex lens toward the workpiece so that the workpiece is pressed against the machining table. The method also includes retaining the sheet-like workpiece on the machining table using suction while continuously pressing the sheet-like workpiece with the pressing member and releasing the pressing force of the pressing member while retaining the sheet-like workpiece.

17 Claims, 5 Drawing Sheets

FIG.3E

FIG.5A
FIG.5B
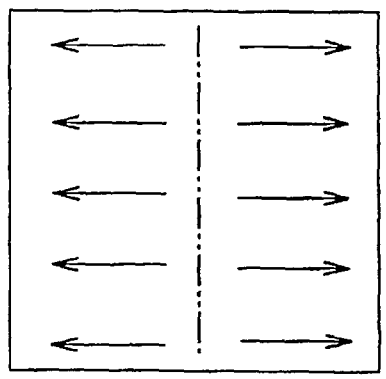
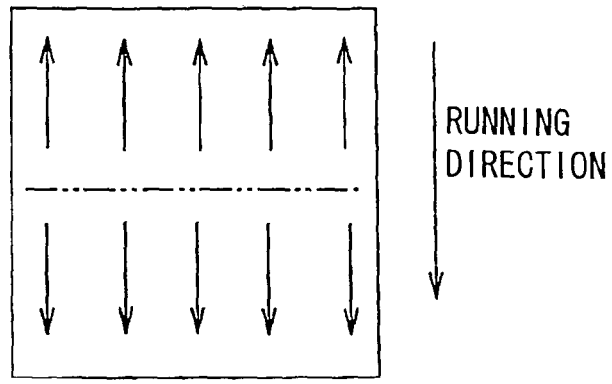
RUNNING DIRECTION

METHOD AND DEVICE FOR HOLDING SHEET-LIKE WORKPIECE

BACKGROUND OF THE INVENTION

1. Field of the Invention

The present invention relates to a method and a device for holding a sheet-like workpiece by rolling out the sheet-like workpiece wound in a roll to hold a part thereof on a flat table. The invention is suitably applicable to a laser machining apparatus for machining a flexible printed board for example.

2. Description of the Prior Art

As a machining apparatus for machining a sheet-like workpiece, there has been known a laser machining apparatus having, successively, an unwinding unit for unwinding a non-machined material wound in a roll, a machining unit having a machining section (laser head) for drilling the non-machined material and a take-up unit for taking up the finished material in a roll as disclosed in Japanese Patent Laid-Open No. 2004-195510 for example. The laser machining apparatus also includes a machining table disposed so as to be movable relative to a main frame of the machining apparatus such that a plurality of blocks of the non-machined material can be moved and positioned in a longitudinal direction of the material for machining by the machining section. The laser machining apparatus also includes clamp means disposed in a body of the machining table and operates so as to clamp the non-machined material with respect to the machining table when the machining table moves from a starting position to an ending position and to release the non-machined material from the machining table when the machining table returns to the starting position. Moreover, the laser machining apparatus includes relative position fixing means that operate to fix relative positions of the non-machined material to the machining apparatus before releasing the non-machined material from the clamp means when the machining table reaches the end position and so as to release the fixed state of the relative position of the non-machined material to the machining apparatus after clamping the non-machined material with the clamping means when the machining table returns to the starting position.

This technology makes it possible to prevent the position of a printed board, i.e., a sheet-like workpiece, from deviating from the laser head and hence improves machining efficiency.

It is noted that the sheet-like printed board is often positioned on the machining table by applying a slight tensile force between a feed roll and a take-up roll, and by fixing the printed board on the machining table using suction or fixtures such as a clamper.

There has also been known a laser machining apparatus having at least a pair of clamps for holding both ends of a material to be machined and a tensioning unit for applying bias between the pair of clamps in a direction of relatively separating from each other to apply a tensile force to the non-machined material as disclosed in Japanese Patent Laid-Open No. 1998-296473 for example.

Since this technology allows the material to be kept flat even if it is apt to curl, it allows machining accuracy to be improved.

Moreover, in laser drilling a printed board on which copper foil is provided, etching is carried out before the drilling and a thickness of the printed board becomes uneven due to etching. Therefore, the printed board wound in a roll after etching causes wrinkles formed almost in parallel with a running direction the printed board.

The wrinkles formed almost in parallel with the running direction are unable to be removed even if a tensile force is applied in the running direction of the printed board. Therefore, the printed board on which etching process has been carried out is held on the table while having the wrinkles.

Although no hole can be machined, causing defective machining, at the wrinkled part because it is out of focus in case of laser machining, no consideration has been given to the wrinkles running almost in parallel with the running direction of the sheet-like workpiece in Japanese Patent Laid-Open Nos. 2004-195510 and 1998-296473.

Accordingly, it is an object of the invention to provide a method and a device capable of holding a sheet-like workpiece on a table without wrinkles.

This object may be achieved through the combination of features described in independent claims of the invention. Dependent claims thereof specify preferable embodiments of the invention.

BRIEF SUMMARY OF THE INVENTION

In order to solve the above-mentioned problem, according to the invention, there is provided a method for holding a sheet-like workpiece by rolling out the sheet-like workpiece wound in a roll so as to hold a part thereof on a flat table. The method includes mounting the sheet-like workpiece on the table (see FIG. 3A), pressing out wrinkles of the sheet-like workpiece by pressing the mounted sheet-like workpiece with a pressing member from a side (upper side) opposite from the table (see FIG. 3B), retaining the sheet-like workpiece on the table (by means of suction for example) while continuously pressing the sheet-like workpiece (see FIG. 3C) and releasing the pressing force of the pressing member while retaining the sheet-like workpiece.

According to the invention, there is also provided a device for holding a sheet-like workpiece having a flat table having retaining means (suction means for example) for retaining the sheet-like workpiece and a pressing member. The pressing member is disposed so as to face to the table and which is capable of contacting the table. The device presses out wrinkles of the sheet-like workpiece by pressing the sheet-like workpiece with the pressing member from a side opposite from the table while mounting the sheet-like workpiece on the table and retains the sheet-like workpiece on the table by the retaining means while pressing the sheet-like workpiece.

The invention allows the sheet-like workpiece to be fixed on the table without wrinkles, so that it allows the machining quality to be improved.

It is noted that the summary of the invention described above does not necessarily describe all necessary features of the invention. The invention may also be a sub-combination of the features described above.

BRIEF DESCRIPTION OF THE DRAWINGS

FIGS. 3A through 3K illustrate operation of the laser machining apparatus to which the invention is applied and show different states thereof.

FIGS. 5A and 5B are schematic diagrams showing directions of force of the pressing member on a workpiece, wherein FIGS. 5A and 5B show different embodiments.

DETAILED DESCRIPTION OF THE INVENTION

Figure 1:
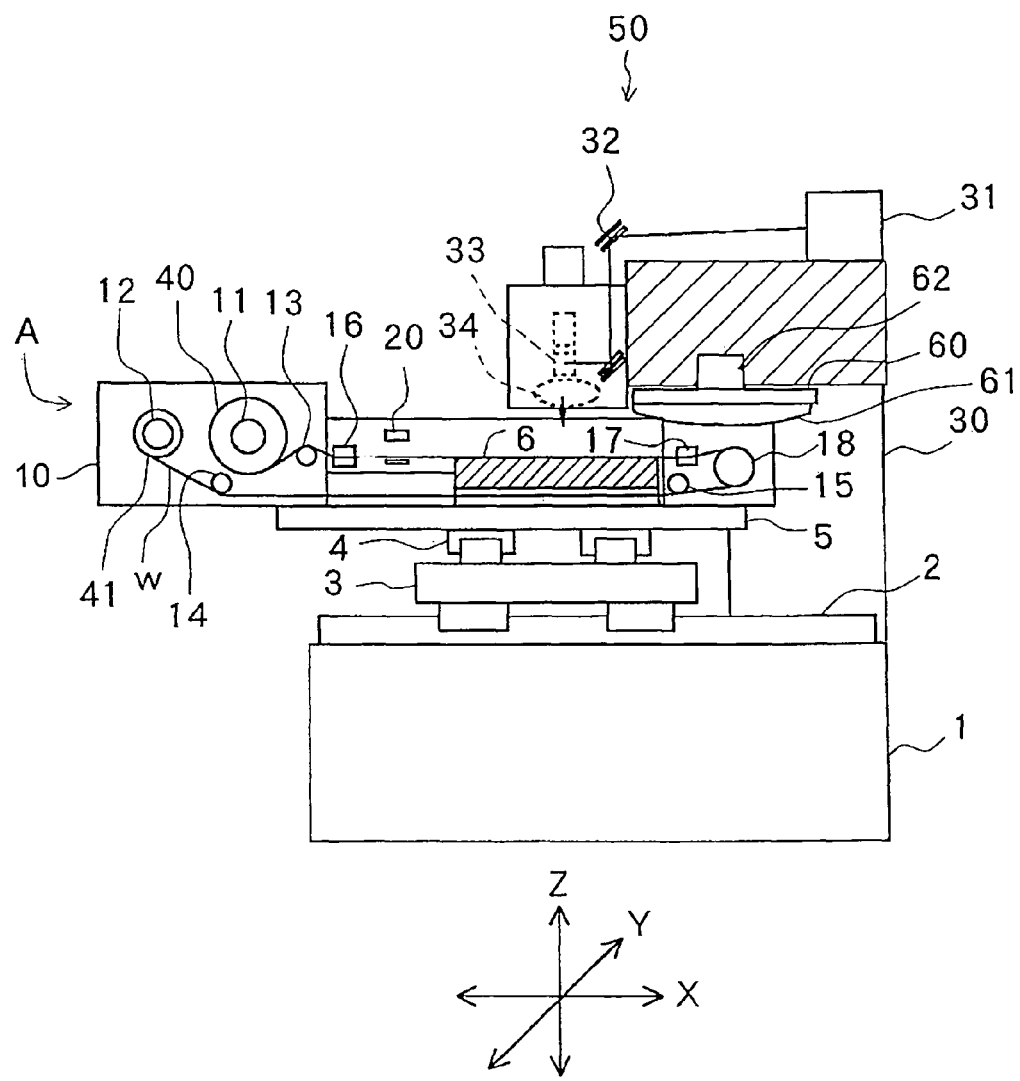
FIG. 1 is a front partial sectional view of a laser machining apparatus to which the invention is applied.

The invention will now be described based on preferred embodiments shown in the drawings, which do not intend to limit the scope of the invention, but exemplify the invention. All of the features and the combinations thereof described in the embodiments are not necessarily essential to the invention.

Figure 2:
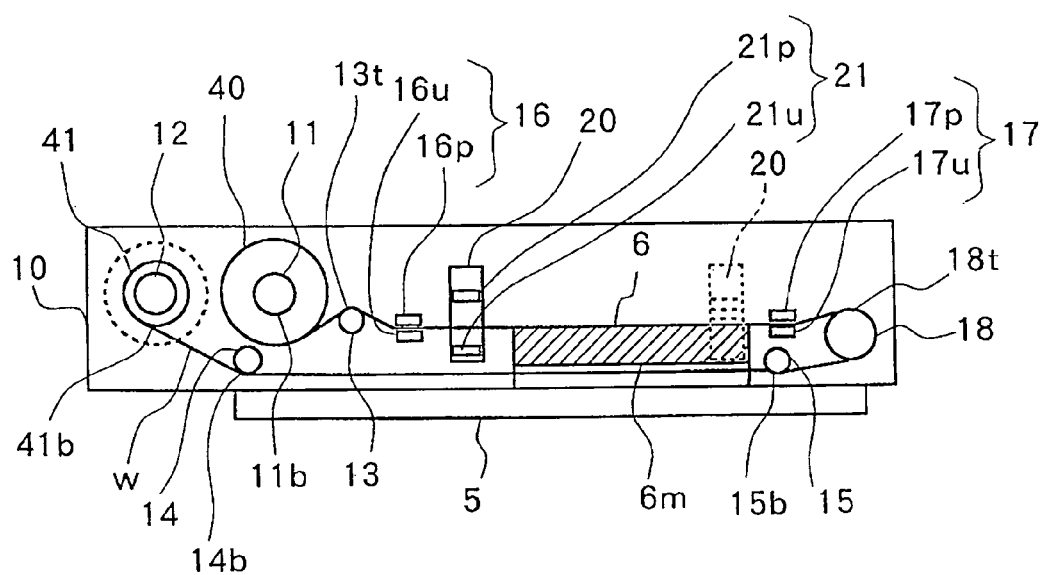
FIG. 2 is an enlarged view of a part A in FIG. 1.

FIG. 1 is a front partial sectional view of a laser machining apparatus 50. FIG. 2 is an enlarged view of a part A in FIG. 1. FIGS. 3A through 3K illustrate operation of the laser machining apparatus 50.

In the laser machining apparatus 50, a gate-like column 30 is fixedly installed on a bed 1. Disposed on the column 30 are a laser oscillator 31, a plurality of mirrors 32 (two in the figure), a pair of optical mirrors 33 and an fθ lens 34.

A linear guide 2 is disposed on the upper face of the bed 1, so that an X table 3 is movable on the bed 1 in the X direction. A linear guide 4 is disposed on the upper face of the X table 3, so that a Y table (mobile table) 5 is movable on the X table 3 in a Y direction. Accordingly, from the configuration described above, the Y table 5 is movable in the X and Y directions with respect to the bed 1.

Disposed on the upper face of the Y table 5 are a machining table 6 and a reel holder 10 as shown in FIG. 2. A channel 6m having a transverse width wider than a width of a sheet-like workpiece (referred to simply as a workpiece hereinafter) w, such as a flexible printed board, is formed on a lower face of the machining table 6 in the X direction. A plurality of holes connected with a hollow section not shown within the machining table 6 are formed on the upper face of the machining table 6. The hollow section (not shown) within the machining table 6 is connected with a vacuum source (not shown). These components compose retaining means. The reel holder 10 is provided with a feed reel 11, a take-up reel 12, guide rollers 13, 14 and 15, clampers 16 and 17, a turning roller 18 and a workpiece conveying unit (moving means) 20.

The feed roll 40, in which non-finished workpiece w is wound in a roll, is held by the feed reel 11. The feed reel 11 is held by the reel holder 10 and is rotated by a motor (not shown). A bottom 11b of the feed reel 11 is positioned under a top 13t of the guide roller 13 adjacent thereto. Accordingly, the feed reel can feed the workpiece w when driven by the motor (not shown) (feed side roll holder).

A take-up roll 41 collects the finished workpiece w and takes it up in a roll. The take-up roll 41 is held by the take-up reel 12. The take-up reel 12 is held by the reel holder 10 and is rotated by a motor (not shown). The take-up reel 12 is disposed at the position where a bottom 41b of the take-up roll 41 is higher than a bottom 14b of the guide roller 14 adjacent to the take-up roll 41. Accordingly, the take-up reel 12 can take up the workpiece w when driven by the motor (not shown) (take-up side roll holder).

The reel holder 10 supports the rotatable guide roller 13 so that a top 13t thereof is higher than a surface (upper face) of the machining table 6. The reel holder 10 also supports the rotatable guide rollers 14 and 15 so that their bottoms 14b and 15b are lower than a bottom face of the channel 6m.

The clampers 16 and 17 are composed of receptors 16u and 17u and pressers 16p and 17p. Pressers 16p and 17p are disposed so as to face the receptors 16u and 17u and are movable in the Z direction (in the vertical direction in the figure) by means (not shown). A lower end of the receptor 16u is set at its standby position such that its upper face is located at a position lower than the surface of the machining table 6. When the receptor 16u is located at its upper position, the upper face is located at the same height with the top 13t of the guide roller 13, i.e., above the surface of the machining table 6. Moreover, a lower end of the presser 16p is set slightly under the upper face of the receptor 16u in the standby position so that the lower face of the presser 16p can press the upper face of the receptor 16u. A lower end of the presser 17p is also set slightly under the upper face of the receptor 17u so that the lower face of the presser 17p can press the upper face of the receptor 17u. The reel holder 10 supports the rotatable turning roller 18 so that a top 18t thereof is set on the same height with the top 13t of the guide roller 13.

The workpiece conveying unit 20 may be freely moved and positioned in the X direction with respect to the reel holder 10 by means of a motor and a guide rail mechanism (not shown). The workpiece conveying unit 20 supports a clamper 21. The clamper 21 is composed of a presser 21p and a receptor 21u movable in the vertical direction. A standby position of the receptor 21u is set at a position whose upper face is lower than the upper face of the machining table 6 as shown by a solid line in FIG. 2, and its upper position is set on the same height with the top 13t of the guide roller 13 and the top 18t of the turning roller 18. Moreover, the standby position of the presser 21p is set such that a lower face thereof is higher than the top 13t of the guide roller 13 and the top 18t of the turning roller 18. A lower end thereof is set slightly below the upper face of the receptor 21u located at its upper position so that the lower face of the presser 21p can press the upper face of the receptor 21u located at its upper position. It is noted that standby position of the workpiece conveying unit 20 in the X direction is set at a movable left end shown by solid lines in the figure and its movable right end is position shown by dashed lines in the figure.

As shown in FIG. 1, a pressing plate 60 is disposed in the column 30 so as to face the Y table 5. A pressing member 61, made from an elastic member, is fixed under the pressing plate 60. A pressing surface (facing the Y table 5) of the pressing member 61 is a curved surface convex to the machining table 6 (i.e., a convex-shaped curved surface), or more specifically, is a curved surface formed in the shape of a convex lens (see downwardly-facing pressing surface of pressing member 61 in FIG. 1) and having an apex at the center of the X and Y directions (axes) of the pressing plate 60. The pressing plate 60 may be moved and positioned in the vertical (Z) direction by a lift 62 held in the column 30.

Next, an operation of the laser machining apparatus 50 will be explained. A situation is considered where a non-finished workpiece w held in the feed roll 40 has wrinkles in the running direction (X direction).

At first, arrangements for this operation will be explained. That is, while opening all of the clamps 16, 17 and 21 in advance such that the receptors 16u and 21u are at their standby positions and the pressers 16p, 17p and 21p are at their upper positions, the feed roll 40 is put on the feed reel 11. The workpiece w is wound around the turning roller 18 and is passed through the channel 6m of the machining table 6 and its end is fixed to the take-up reel 12 (the take-up roll 41).

Figure 3A:
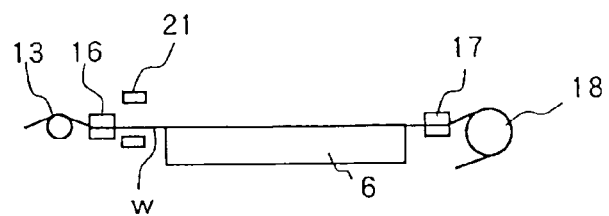

Next, the presser 16p is lowered, while applying a slight clockwise torque to the feed reel 11 and the take-up reel 12, to hold the workpiece w by the clamper 16 while smoothing out wrinkles in the direction orthogonal to the running direction. Moreover, the presser 17p is lowered so that the clamper 17 holds the workpiece w. Then, the workpiece w is fixed on the upper face of the machining table 6 in a state in which tensile force is applied slightly thereon in the running direction, as shown in FIG. 3A.

Although the wrinkles in the part of the workpiece w clamped by the clampers 16 and 17 are smoothed out, the wrinkles around the center of the machining table 6 are not.

Figure 3B:
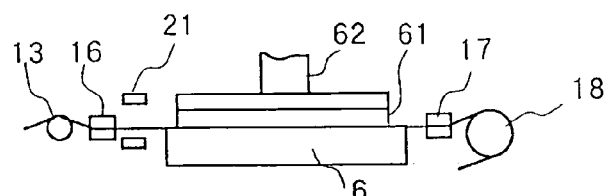
Figure 4:
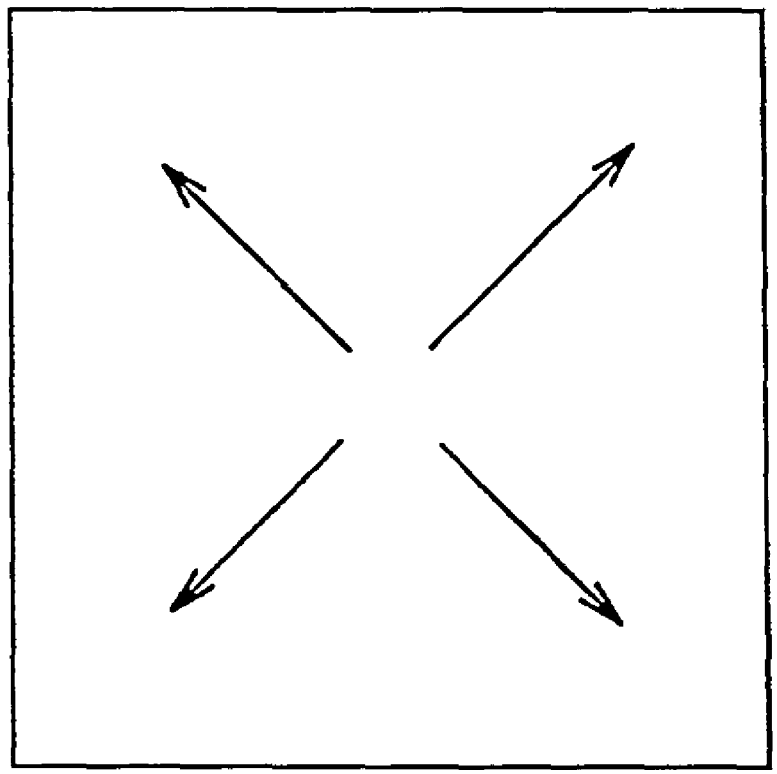
FIG. 4 is a schematic diagram showing directions of force of a pressing member acting on a workpiece.

Next, after positioning the center of the machining table 6 to the center of the pressing member 61 by moving the Y table 5, the pressing plate 60 is lowered to a point where the surface of the pressing member 61 becomes almost flat, as shown in FIG. 3B. It is noted that the whole area of the workpiece w to be machined contacts and is pressed by the pressing member 61. After the pressing member 61 contacts the workpiece w, an area of the pressing member 61 contacts the workpiece w and expands concentrically, as indicated by arrows in FIG. 4, such that the wrinkles formed on the workpiece w are pressed out.

Figure 3C:
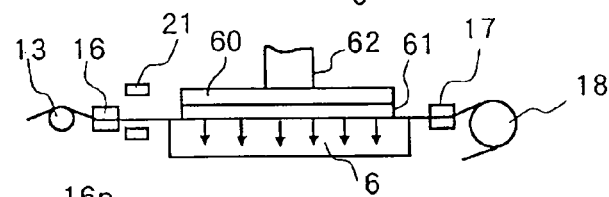

Next, a vacuum source (not shown) is put into operation while lowering the pressing plate 60 so that the workpiece w is sucked to the surface of the machining table 6, as shown in FIG. 3C. As a result, the workpiece w is fixed on the surface of the machining table 6 without wrinkles.

After fixing the workpiece was described above, machining is carried out. That is, the machining table 6 is moved to position an area to be machined with respect to the fθ lens 34, and the laser oscillator 31 is put into operation such that a laser beam outputted from the laser oscillator 31 is guided to the optical mirror 33 via the mirrors 32. Then, the laser beam is positioned by the optical mirror 33 and is caused to be incident on the workpiece w by the fθ lens 34 while vertically setting an optical axis of the laser beam to machine the workpiece w. After ending the machining of the machining area determined by the fθ lens 34, the X table 3 or the Y table 5 is moved to machine a next machining area.

Figure 3D:
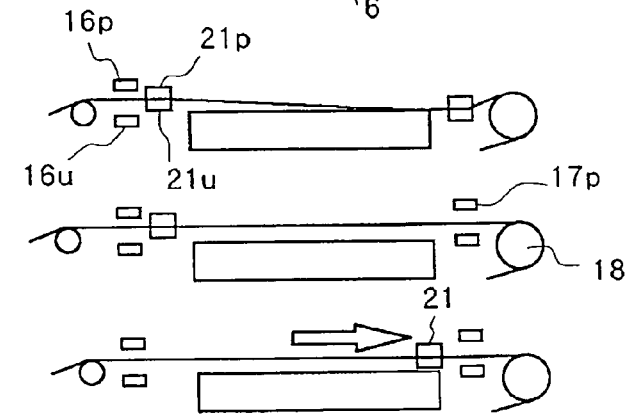

Next, a step for moving the workpiece after ending machining will be explained. After ending machining, the vacuum source (not shown) is turned off and the presser 16p is raised. Then, the clamper 21 is put into operation as shown in FIG. 3D. That is, after raising the receptor 21u, the presser 21p is lowered so as to hold the workpiece w by the presser 21p and the receptor 21u.

Next, the presser 17p is raised as shown in FIG. 3E. As a result, the workpiece w is positioned at a height of the top 13t of the guide roller 13 and the top 18t of the turning roller 18.

Figure 3F:
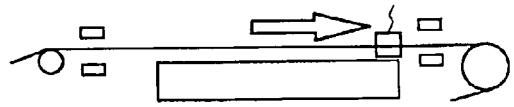

In this state, the workpiece conveying unit 20 is moved to the right in the figure by a desirable distance, as shown in FIG. 3F. It is noted that at this time, the portion of workpiece w whose machining has been finished is taken up by the take-up reel 12 while feeding the workpiece w by the feed reel 11.

Figure 3G:
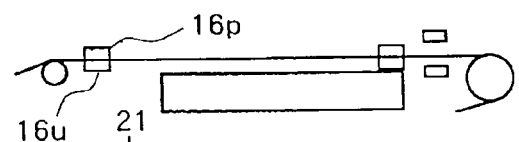

Next, after moving the receptor 16u to its upper position, the presser 16p is lowered, as shown in FIG. 3G, to hold the workpiece w by the clamper 16.

Figure 3H:

Next, the clamper 21 is released. At this time, the presser 21p is moved to its upper position and the receptor 21u is moved to a position where its upper face does not contact with the workpiece w and where it does not contact with the upper face of the machining table 6. Then, the workpiece conveying unit 20, i.e., the clamper 21, is returned to its standby position as shown in FIG. 3H.

Figure 3I:
Figure 3J:
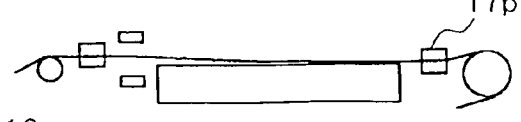
Figure 3K:
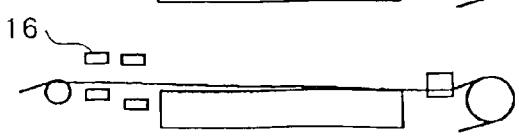

Next, after positioning the receptor 21u to its standby position, as shown in FIG. 3I, the presser 17p is lowered to hold the workpiece w by the clamper 17, as shown in FIG. 3J. Then, the clamper 16 is released as shown in FIG. 3K. Then, after positioning the receptor 16u to its standby position, the presser 16p is lowered to hold the workpiece w by the clamper 16 (see FIG. 3A). These steps are repeatedly carried out thereafter.

During the steps described above and during machining, the feed reel 11 and the take-up reel 12 are driven with a certain range of torque that will have no adverse effect on the workpiece w. Tensile force is applied to the workpiece w so that the workpiece w does not sag. It is noted that the tensile force may be applied by biasing the rollers 13 and 14, the turning roller 18 and others in predetermined directions by springs or the like.

As described above, because the laser machining apparatus 50 adopting the inventive sheet-like workpiece holding method allows the workpiece w to be machined without wrinkles, machining may be carried out in high quality.

Moreover, according to the present embodiment, because the feed reel and the take-up reel are disposed on one side on the machining table 6, no space for forming a free loop of the sheet-like workpiece is required and an installation area of the whole laser machining apparatus 50 may be reduced. Further, because this configuration requires fewer components, the control can be made readily.

Further, because the feed reel and the take-up reel are disposed on one side on the machining table 6, the installation area of the whole laser machining apparatus 50 may be reduced as compared to a case of disposing them on both sides of the machining table 6.

Moreover, the invention allows the wrinkles to be pressed out even if the wrinkles run in the direction other than the running direction of the workpiece w. It is noted that although the surface of the pressing member 61 is formed into the shape of a convex lens so as to have its apex at the center of the X and Y directions of the pressing plate, it may be a cylindrical face whose axis is disposed in parallel with the running direction (X direction). Thereby, because a contact area of the pressing member 61 with the workpiece w expands gradually in a width direction as shown in FIG. 5A, the wrinkles caused in the workpiece w may be pressed out.

The wrinkles of the workpiece w may also be pressed out in the same manner with the case described above by disposing the axis of the cylindrical face orthogonally or obliquely to the running direction as shown in FIG. 5B.

It is noted that the shape of the surface of the pressing member 61 may be any shape as long as it can increase its contact area with the workpiece w gradually from the center part to the peripheral part, such as a part of an ellipsoid.

Furthermore, the pressing member 61 may be made from a solid elastic member or may have a space in which a fluid is filled. The pressing member 61 may be also a porous elastic member, e.g., sponge.

When the pressing member 61 is made from sponge, the pressing member 61 may be separated readily from the workpiece w after sucking the workpiece w by the Y table 5, in the step in FIG. 3C, even if through holes are formed in the workpiece w.

An adhesive layer may be provided on the surface of the pressing member 61 to provide a function of removing dust on the surface of the workpiece w.

The invention is applicable not only to the case of machining printed boards but also to a case of machining other sheet-like workpieces.

Although the invention has been described by way of the exemplary embodiments, it should be understood that those skilled in the art might make many changes and substitutions without departing from the spirit and scope of the invention. It is obvious from the definition of the appended claims that the embodiments with such modifications also belong to the scope of the invention.

What is claimed is:

1. A method of machining a sheet-like flexible printed board by rolling out the flexible printed board wound in a roll and by holding a part of the flexible printed board on a flat mounting plane of a table, said method comprising:
   mounting the flexible printed board on the flat mounting plane of the table;
   adjusting a pressing member having a curved pressing surface so that the curved pressing surface faces the table and protrudes toward the flexible printed board mounted on the mounting plane of the table, the pressing member being made of a resilient elastic material;
   pressing out wrinkles of the flexible printed board by lowering the pressing member to contact and press a side of the mounted flexible printed board opposite the mounting plane of the table so as to remove the wrinkles, said pressing out the wrinkles comprising contacting the protruding curved pressing surface with the flexible printed board and pressing to increase an area of contact between the curved pressing surface of the pressing member and the flexible printed board by elastic deformation of the curved pressing surface of the pressing member made of resilient elastic material;
   retaining the flexible printed board on the mounting plane of the table by applying a suction force to the flexible printed board while pressing the flexible printed board with the pressing member to maintain a state in which the wrinkles have been removed from the flexible printed board;
   releasing the pressure applied by the pressing member against the flexible printed board while retaining the flexible printed board on the mounting plane of the table by the suction force;
   drilling holes in the flexible printed board using a drilling device while retaining the flexible printed board on the mounting plane of the table by the suction force; and
   releasing the flexible printed board from being retained on the mounting plane of the table by lowering the suction force so as to allow the drilled flexible printed board to be taken up by a take-up reel while also allowing a non-drilled portion of the flexible printed board to be supplied to the flat mounting plane of the table by a supply reel.

2. The method of claim 1, wherein the pressing member made of the resilient elastic material has a convex-shaped pressing surface with an apex at a center part of the curved pressing surface, said pressing comprises contacting the apex of the pressing member with the flexible printed board such that the pressing member presses out the wrinkles of the flexible printed board in a direction from a center part of the flexible printed board toward a peripheral part of the flexible printed board as the pressing member elastically deforms radially outward from the center part of the flexible printed board toward the peripheral part of the flexible printed board.

3. The method of claim 1, wherein the pressing member made of the resilient elastic material has a cylindrical shape with a cylindrical pressing surface, said pressing further comprises contacting the cylindrical pressing surface of the cylindrical pressing member with the flexible printed board such that the cylindrical pressing member presses out the wrinkles of the flexible printed board in a direction from a center part of the flexible printed board toward a peripheral part of the flexible printed board as the cylindrical pressing member elastically deforms in a width direction of the cylindrical pressing member.

4. The method of claim 3, wherein said pressing further comprises orienting the cylindrical pressing surface of the pressing member such that a center axis of the pressing member is parallel with a direction in which the flexible printed board is supplied and discharged.

5. The method of claim 3, wherein said pressing further comprises orienting the cylindrical pressing surface of the pressing member such that a center axis of the pressing member intersects with a direction in which the flexible printed board is supplied and discharged.

6. The method of claim 1, wherein said drilling holes is performed after said releasing the pressure applied by the pressing member.

7. The method of claim 1, further comprising, after said releasing the flexible printed board from being retained on the mounting plane of the table by lowering the suction force, taking up the drilled flexible printed board on the take-up reel while simultaneously supplying a non-drilled portion of the flexible printed board to the mounting plane of the table from the supply reel.

8. An apparatus for machining a sheet-like flexible printed board, comprising:
   a table having a flat mounting plane for supporting the flexible printed board during the machining;
   a supply reel for supplying the flexible printed board to said mounting plane of said table;
   a take-up reel for taking up the flexible printed board from said mounting plane of said table;
   a pressing member operable to approach and separate from said mounting plane of said table, said pressing member being made of a resilient elastic material and having a curved pressing surface for facing and protruding toward the flexible printed board to be mounted on said table, said pressing member being oriented and configured such that, when said pressing member is pressed against the flexible printed board to be mounted on said mounting plane of said table, said protruding curved pressing surface contacts the flexible printed board and said curved pressing surface is elastically deformed so as to increase an area of contact between said curved pressing surface of said pressing member and the flexible printed board to thereby press out wrinkles from the flexible printed board;
   a retaining device having a first end connected to a vacuum source and a second end having a plurality of holes opened to a surface of said mounting plane of said table, said retaining device being operable to apply suction from the vacuum source to the flexible printed board for holding the flexible printed board on said mounting plane while said pressing member presses the flexible printed board so as to maintain a state in which the wrinkles have been removed from the flexible printed board; and
   a drilling device for drilling the flexible printed board held on said mounting plane by said retaining device.

9. The apparatus of claim 8, wherein said pressing member has a convex-shaped pressing surface with an apex at a center part of said protruding curved pressing surface, said semi-spherical pressing member being configured such that, when pressing the flexible printed board, said apex contacts the flexible printed board such that the wrinkles of the flexible printed board are pressed out in a direction from a center part of the flexible printed board toward a peripheral part of the flexible printed board as said pressing member elastically deforms radially outward from the center part of the flexible printed board toward the peripheral part of the flexible printed board.

10. The apparatus of claim 8, wherein said pressing member has a cylindrical shape with a protruding cylindrical pressing surface, said cylindrical pressing member being configured such that, when pressing the flexible printed board, said cylindrical pressing surface contacts the flexible printed board such that the wrinkles of the flexible printed board are pressed out in a direction from a center part of the flexible printed board toward a peripheral part of the flexible printed board as said cylindrical pressing member elastically deforms in a width direction of said cylindrical pressing member.

11. The apparatus of claim 10, wherein said cylindrical pressing surface of said pressing member is arranged such that a center axis of said pressing member is parallel with a direction in which the flexible printed board is supplied and discharged.

12. The apparatus of claim 10, wherein said cylindrical pressing surface of said pressing member is arranged such that a center axis of said pressing member intersects with a direction in which the flexible printed board is supplied and discharged.

13. The apparatus of claim 8, further comprising a moving device for moving said table to adjust a center part of the flexible printed board mounted on said table relative to a center part of said protruding curved pressing surface of said pressing member.

14. The apparatus of claim 8, wherein said drilling device is operable to drill holes after said pressing member releases the pressure applied to the flexible printed board.

15. The apparatus of claim 8, wherein said take-up reel is operable to take up the drilled flexible printed board while said supply reel simultaneously supplies a non-drilled portion of the flexible printed board to said mounting plane of said table.

16. The method of claim 1, wherein the pressing member has a convex-shaped pressing surface with an apex at a center of an X-axis and a Y-axis of the pressing member.

17. The apparatus of claim 8, wherein said pressing member has a convex-shaped pressing surface with an apex at a center of an X-axis and a Y-axis of said pressing member.

* * * * *